United States Patent [19]

Huseby et al.

[11] 4,189,326

[45] Feb. 19, 1980

[54] NONSTOICHIOMETRIC $MgAl_2O_3$ FOR CASTING ADVANCED SUPERALLOY MATERIALS

[76] Inventors: Irvin C. Huseby, Apt. A-8, Van Antwerp Village, Schenectady, N.Y. 12309; Frederic J. Klug, 99 Van Dyke Ave., Amsterdam, N.Y. 12010

[21] Appl. No.: 867,190

[22] Filed: Jan. 5, 1978

Related U.S. Application Data

[62] Division of Ser. No. 775,758, Mar. 9, 1977, Pat. No. 4,108,676.

[51] Int. Cl.$^2$ .................. C04B 35/04; C04B 35/44; B28B 7/34; C01F 7/16
[52] U.S. Cl. .................................... 106/62; 106/38.9; 106/65; 106/73.4; 423/600; 423/635
[58] Field of Search .................. 423/600, 635; 106/65, 106/62, 73.4, 38.9

[56] References Cited

PUBLICATIONS

Alpen A. M. et al., "The System $MgO-MgAl_2O_4$", J. American Ceramic Soc., 45[6]264, (1962).
Roy D. M. et al., "The System $MgO-Al_2O_3-SiO_2$ and Influence of Carbine . . . . Equilibrium," in J. American Ceramics Soc., 36[5]149, (1953).

*Primary Examiner*—O. R. Vertiz
*Assistant Examiner*—Mark Bell

[57] ABSTRACT

Mixed oxide compounds $La_2O_3 \cdot 11Al_2O_3$, $NdAlO_3$ and nonstoichiometric $MgAl_2O_3$ are suitable for making cores and molds for casting advanced superalloy materials such as NiTaC-13.

2 Claims, No Drawings

NONSTOICHIOMETRIC MgAl₂O₃ FOR CASTING ADVANCED SUPERALLOY MATERIALS

This is a division of application Ser. No. 775,758, filed Mar. 9, 1977, now U.S. Pat. No. 4,108,676.

BACKGROUND OF THE INVENTION

1. Field of the Invention

This invention relates to materials suitable for making cores and molds for the casting a directional solidification of advanced superalloy materials.

2. Description of the Prior Art

Advanced superalloy materials, such as NiTaC-13, and other similar metal eutectic alloys are cast and directionally solidified at temperatures of about 1700° C. and above for upwards of 30 hours exposure thereto. Therefore, cores and molds employed therewith must have high temperature strength and nonreactivity with the molten metal. That is, the mold and core material must not dissolve in the cast molten metal nor form an excessively thick interface compound with the molten metal. The cores also must be compatible with the advanced superalloy to prevent hot tearing, or hot cracking, during solidification.

It is therefore an object of this invention to provide new and improved materials for making cores and molds for the casting of advanced superalloy materials.

Another object of this invention is to provide new and improved materials for making cores and molds for the casting of advanced superalloy materials which are also easily removable from castings without detrimentally affecting the metal casting.

Other objects of this invention will, in part, be obvious and will, in part, appear hereinafter.

BRIEF DESCRIPTION OF THE INVENTION

In accordance with the teachings of this invention there is provided a ceramic article suitable for use in the casting and directional solidification of advanced superalloy materials such, for example, as NiTaC-13. The article is made of a mixed oxide compound which is one selected from the group consisting of $La_2O_3.11Al_2O_3$, $NdAlO_3$ and the nonstoichiometric $MgAl_2O_3$. The article has a density ranging from about 30 percent to 90 percent to provide a porosity content of from about 10 percent by volume to about 70 percent by volume. The porosity, along with at least some of the pores being interconnected permit the use of the materials to be employed for making cores which minimize hot tearing of the cast metal. The mixed oxide compounds are removed from the casting by dissolving in molten salts.

DESCRIPTION OF THE INVENTION

Three materials have been discovered to be suitable for making cores and molds for the casting and directional solidification of advanced superalloy materials such, for example, as NiTaC-13. These materials are $La_2O_3.11Al_2O_3$, $NdAlO_3$ and nonstoichiometric $MgAl_2O_4$. By nonstoichiometric $MgAl_2O_4$ is meant that $MgAl_2O_4$ is in equilibrium with $Al_2O_3$.

The $La_2O_3$ content in $La_2O_3.11Al_2O_3$ is from 8 mole percent to 9 mole percent. The $Nd_2O_3$ content in $NdAlO_3$ is 50 mole percent. The $Al_2O_3$ content in $MgAl_2O_4$ is from 80 mole percent to about 50 mole percent.

Each of the above material compositions may be prepared by either of three methods. In a first method a mechanical mixture of the proper amounts of each of the two oxides are prepared. A measured amount of the prepared mixture is then pressed into a desired configuration of a predetermined density wherein the porosity content is from about 25 percent by volume to about 70 percent by volume. The pressed shape is then sintered at a temperature of from about 1400° C. to about 1900° C.

A second method is to mechanically mix the proper amounts of the oxides. The mechanical mixture is then calcined at an elevated temperature of from about 600° C. to about 1700° C. and for a predetermined period of time which is dependent upon the calcining temperature. The time varies from about 20 minutes to about 6 hours. After calcining the material is crushed and ground to a desired particle size. This prepared material is then pressed into a desired configuration having a density ranging from 30 percent to 70 percent. The pressed article is then sintered. The porosity content of the sintered article is from about 10 percent by volume to about 70 percent by volume.

A third method of preparing the material compositions is the mechanically mix the proper amounts of the oxides and then fuse-cast them by heating them close to or above their melting temperature. After fuse casting, the mixture will consist essentially of the desired mixed oxide compound. The fused-cast material is then refined into the desired particle size of from about 10 microns to about 150 microns by suitable milling techniques such as hammer-milling, ball-milling, and the like. The desired core configurations are then prepared from this material.

Complicated shapes may be prepared from materials made by any of the above methods by employing a suitable manufacturing technique such as injection molding, transfer molding, and the like.

The range of porosity recited above is to enable the cast metal to shrink during cooling about a core made of one of the materials without the fear of hot tearing, or hot cracking, of the cast metal occurring. At least 10 percent of the pores should be interconnected to aid in leaching of the material from the cast metal.

Samples of each of the materials were exposed to NiTaC-13 metal at 1800° C. in a sessile drop test for a period of 1 hour in flowing argon gas. During this period of time it was observed that the wetting angle was rather large. The wetting angle was about 90° for each of the material samples. This large wetting angle is very desirable for metal surface finish when casting metals around ceramic molds and cores.

Upon cooling the surface of the NiTaC-13 metal was examined first. The NiTaC-13 had not reacted with either one of the materials comprising the ceramic samples. Therefore, the surface finish is acceptable for commercial casting production.

It is believed that the three materials $La_2O_3.11Al_2O_3$, $NdAlO_3$ and nonstoichiometric $MgAl_2O_3$ each have a more negative free energy of formation than $Al_2O_3$. Therefore, NiTaC-13, a metal containing carbon is considerably less susceptible to decarburization when cast in molds or at around cores of these three mixed oxide compounds as compared to when NiTaC-13 is cast in $Al_2O_3$ molds or around $Al_2O_3$ cores.

The removal of these three mixed oxide compounds, when used as core materials, from the inside of the casting is accomplished by use of molten salts. Preferably, the removal is practiced in an inert atmosphere. Suitable molten salts are molten fluoride salts and/or molten chloride salts such as $M_3AlF_6$, $M_3AlF_6+MF$, $M_3AlF_6+M'F_2$ and $M_3AlF_6+MCl$ wherein M is Li, Na or K and M' is Mg, Ca, Ba or Sr. The temperature of the molten salt for dissolving the core material is of course dependent upon the salt or salt mixture employed and the rate of dissolution of the core material desired.

We claim as our invention:

1. A ceramic article for use in the casting and directional solidification of advanced superalloy materials comprising
    a mixed oxide compound material consisting essentially of nonstoichiometric $MgAl_2O_3$,
    a porosity content which is from about 10 percent by volume to about 70 percent by volume,
    at least 10 percent of the porosity is interconnected, and
    the material of the ceramic article is leachable in a molten salt bath selected from the group consisting of $M_3AlF_6$, $M_3AlF_6+MF$, $M_3AlF_6+M'F_2$ and $M_3AlF_6+MCR$ wherein
    M is Li, Na, or K
    M' is Mg, Ca, Ba or Sr.

2. The ceramic article of claim 1 wherein the $Al_2O_3$ content is from about 50 mole percent to about 80 mole percent of the mixed oxide compound.

UNITED STATES PATENT AND TRADEMARK OFFICE
CERTIFICATE OF CORRECTION

PATENT NO. : 4,189,326

DATED : February 19, 1980

INVENTOR(S) : Irvin C. Huseby et al.

It is certified that error appears in the above-identified patent and that said Letters Patent are hereby corrected as shown below:

On the title page, Item [73] should read:

--- General Electric Co. ---.

*Signed and Sealed this*

Twelfth Day of August 1980

[SEAL]

*Attest:*

SIDNEY A. DIAMOND

*Attesting Officer*     *Commissioner of Patents and Trademarks*